(12) United States Patent
Travis

(10) Patent No.: US 6,847,488 B2
(45) Date of Patent: Jan. 25, 2005

(54) FAR-FIELD DISPLAY

(75) Inventor: Adrian Robert Leigh Travis, South Devon (GB)

(73) Assignee: Cambridge Flat Projection Displays Limited, Cambridgeshire (GB)

( * ) Notice: Subject to any disclaimer, the term of this patent is extended or adjusted under 35 U.S.C. 154(b) by 0 days.

(21) Appl. No.: 10/680,610

(22) Filed: Oct. 7, 2003

(65) Prior Publication Data

US 2004/0130797 A1 Jul. 8, 2004

Related U.S. Application Data

(63) Continuation of application No. PCT/GB02/01586, filed on Apr. 5, 2002.

(51) Int. Cl.⁷ ........................ G02B 27/14; G02B 5/32; G02B 6/34; G09G 5/00; F21V 7/04
(52) U.S. Cl. ................. 359/630; 359/633; 359/634; 359/15; 345/6; 345/7; 345/8; 385/27; 385/37; 385/115; 385/146; 362/31; 353/7; 348/41; 349/62; 349/65
(58) Field of Search ........................ 385/27, 37, 115, 385/146, 24; 362/31; 349/62, 65, 5; 353/7, 8; 348/41, 51; 359/630, 631, 633, 634, 15, 721, 33, 34; 345/6, 7, 8, 5

(56) References Cited

U.S. PATENT DOCUMENTS

| | | | | |
|---|---|---|---|---|
| 4,711,512 A | * | 12/1987 | Upatnieks | 345/7 |
| 5,369,415 A | * | 11/1994 | Richard et al. | 345/6 |
| 5,381,502 A | * | 1/1995 | Veligdan | 385/115 |
| 5,452,385 A | * | 9/1995 | Izumi et al. | 385/37 |
| 5,465,311 A | * | 11/1995 | Caulfield et al. | 385/27 |
| 5,600,454 A | | 2/1997 | Trayner et al. | |
| 5,668,913 A | | 9/1997 | Tai et al. | |
| 5,703,667 A | * | 12/1997 | Ochiai | 349/65 |
| 5,724,163 A | * | 3/1998 | David | 359/15 |
| 6,147,725 A | * | 11/2000 | Yuuki et al. | 349/65 |
| 6,169,613 B1 | * | 1/2001 | Amitai et al. | 359/15 |
| 6,181,367 B1 | | 1/2001 | McGrew et al. | |
| 6,196,691 B1 | * | 3/2001 | Ochiai | 362/31 |
| 6,300,986 B1 | | 10/2001 | Travis | |
| 6,712,471 B1 | * | 3/2004 | Travis et al. | 353/7 |

FOREIGN PATENT DOCUMENTS

| | | |
|---|---|---|
| DE | 19646943 A1 | 5/1998 |
| EP | 0676902 A2 | 10/1995 |
| EP | 0866264 A1 | 9/1998 |
| WO | WO 98/15128 | 4/1998 |

OTHER PUBLICATIONS

Chen, C. H., et al., "Strategies for 3D video with wide fields–of–view," IEE Proc.—Optoelectron., Apr. 2001, pp. 85–90, vol. 148, No. 2, Univ. of Cambridge, Cambridge, UK.

Amitai, Y., et al., "Visor–display design based on planar holographic optics," Applied Optics, Mar. 10, 1995, pp. 1352–1356, vol. 34, No. 8, Optical Society of America.

Travis, A. R. L., "Autostereoscopic 3–D display," Applied Optics, Oct. 10, 1990, pp. 4341–4343, vol. 29, No. 29, Optical Society of America.

* cited by examiner

*Primary Examiner*—Loha Ben
(74) *Attorney, Agent, or Firm*—Young & Basile, P.C.

(57) ABSTRACT

A flat-panel projection display comprises a transparent slab and integral area grating, a transparent rod with rectangular cross-section and integral linear grating, arranged along the edge of the slab, and a small video projector. The projector is arranged to direct a virtual image into the end of the rod, directly or via mirrors, the light travelling along the rod via total internal reflection. The linear grating diverts the light into the plane of the slab, and the area grating projects it out of the slab towards a viewer, so that the viewer sees an image at infinity.

8 Claims, 3 Drawing Sheets

FAR-FIELD DISPLAY

CROSS-REFERENCE TO RELATED APPLICATIONS

This application is a continuation of International Application No. PCT/GB02/01586, filed Apr. 5, 2002, which claims priority from GB0108838.4, filed Apr. 7, 2001, as to all subject matter in common therewith.

FIELD OF THE INVENTION

This invention relates to the field of 3D displays, head-mounted displays and projection displays and is a way of making them flat.

BACKGROUND OF THE INVENTION

Projection displays conventionally comprise a two-dimensional array of light emitters and a projection lens. The lens forms an image of the array at some plane in space, and if this imaging plane is far from the projection lens then the effect of the projection lens is to collimate light from any pixel on the two dimensional array.

Projection displays are most commonly directed so that the image of the array falls on a large translucent screen, and a viewer looking at the screen will see a greatly magnified image of the picture on the two-dimensional array. But applications are becoming increasingly common in which small projection displays are mounted on the head of the viewer so that the projection display is directed towards the viewer's eye, and light collimated by the projection lens from a single pixel on the two-dimensional array of light emitters is subsequently focussed by the cornea onto the retina so that the viewer sees an apparently distant image often known as a virtual image.

It is also possible for a large-diameter projection display to be placed behind a liquid-crystal display or some other spatial light modulator in order to synthesise a three-dimensional image. See for instance Travis, A R L, "Autostereoscopic 3-D Display", Applied Optics, Vol. 29, No. 29, pages 4341–4343, 10 Oct. 1990. One pixel at a time of the two-dimensional array of light emitters is illuminated, and an appropriate view of a three-dimensional object is simultaneously displayed on the liquid-crystal display so that the view of the three-dimensional object is only visible if observed from the direction in which the rays of light collimated by the projection lens from the pixel are travelling. A sequence of views is repeated at a rate faster than that at which the eye can detect flicker, thereby time-multiplexing a three-dimensional image. It is furthermore possible in principle to create a holographic three-dimensional image by placing a two-dimensional array of point-source light emitters in the focal plane of the projection lens, illuminating each point source in turn, and displaying appropriate holograms on a liquid-crystal display placed on top of the projection lens so that each hologram is made visible to a different point of view in turn.

Head-mounted displays are bulky and users would prefer them to be flat. A head-mounted display can be made flatter using a slab waveguide incorporating a weak hologram as shown by Amitai, Y., Reinhorn, S. and Friesem, A. A., "Visor-display design based on planar holographic optics", Applied Optics Vol 34, No. 8, pp 1352–1356, 10 Mar. 1995. Light from a cathode-ray tube and hologram is coupled into the waveguide, and this light will be diffracted out of the waveguide by the hologram in directions which are determined by the pixel within the cathode ray tube from which the light was emitted.

Three-dimensional images synthesised by time-multiplexing the illumination of a liquid-crystal display require the liquid-crystal display to have a fast-switching array of thin-film transistors and these are expensive. Trayner and Orr have demonstrated a device which avoids this by placing a hologram behind a conventional liquid-crystal display that directs the illumination of alternate rows to a left-eye or right-eye view. This is described in their U.S. Pat. No. 5,600,454. However, both this and the switched-illumination concept are bulky, and users would prefer three-dimensional displays to be flat.

A flat-panel three-dimensional display can be made by combining a projection display with a screen on which light shone parallel to the surface of the screen is ejected at one of a set of selectable lines along the screen, as described in the inventor's earlier WO 98/15128. One line at a time on the screen is selected, and simultaneously the projection display projects a line of pixels parallel to the screen so that they are ejected at the selected line. The same line of pixels on the projection display is altered repeatedly as each of the series of lines on the screen is selected in turn in such a way as to time-multiplex a complete image on the screen. Only one line of the projection display is used, so the array of light emitters need be only one line high, and if the emitted light is collimated in the plane of the screen then the projection lens need be only one or two millimeters high so that the combined projector and screen are flat.

If it is light from a three-dimensional display, albeit one whose array of light emitters is only one pixel high, that is directed parallel to the surface of the screen of selectable lines, then the image formed on the screen is three-dimensional. The three-dimensional display might comprise an array of light emitters behind a projection lens with a liquid-crystal display in front of the projection lens, as described above, but in order to put up several views within one line period of the display, the switching rate of the liquid crystals would need to equal the number of views times the line rate of the display, and few liquid-crystal mixtures switch this fast.

Many other kinds of autostereoscopic and holographic three-dimensional display concepts exist and any could be used in a flat-panel system. Particularly interesting is an old concept comprising a group of small video projectors in the focal plane of a field lens. Each projector is positioned to form a view in the plane of the field lens just as if the lens were a translucent screen, but unlike a translucent screen the field lens collimates the light so that the picture is visible from only a single direction. The other projectors form views which are made visible by the field lens to other directions so that the viewer sees an autostereoscopic three-dimensional image. However, viewers prefer three-dimensional images to be autostereoscopic both in azimuth and in elevation, and little consideration has been given with this concept to making views vary with elevation.

SUMMARY OF THE INVENTION

According to the present invention there is provided a flat-panel projection display comprising a transparent slab and integral area grating, a transparent rod with rectangular cross-section and integral linear grating, arranged along the edge of the slab, and a small video projector, in which the projector is arranged to direct the image into the end of the rod, the linear grating is adapted to divert it via an edge into the plane of the slab, and the area grating is adapted to project it out of the slab towards a viewer.

One or both of the gratings can be diffractive, formed preferably by etching lines on the appropriate surface of the respective rod or slab element, i.e. the surface facing the slab or the viewer respectively. Alternatively a half-reflective system can be used, in which individual transparent plates are stacked, at an angle between that of the incoming light and the desired exit direction, to form the rod or slab with a succession of interfaces in the path of the beam, each of which reflects part of the incoming light. In this way each ray entering the system leaves at a corresponding unique angle, but expanded over the area of the slab.

The projector injects a collimated image into the optical system which is simply reflected, preserving the collimation, by the walls of the slab and partially reflected by the gratings so as to expand the image which then emerges, still collimated, over the entire area of the slab element. Each direction thus corresponds to one pixel of the image. A viewer looking at infinity with this element in his view will then see a distant image, which can be used in a head-up display or virtual-reality viewer.

Two-stage optical expansion systems are known—see for instance U.S. Pat. No. 5,668,913 by Tai et al., but they have been used simply for expanding point sources to area sources and have not been applied to far-field imaging systems.

BRIEF DESCRIPTION OF THE DRAWINGS

For a better understanding of the invention embodiments of it will now be described, by way of example, with reference to the accompanying drawings, in which.

DESCRIPTION OF EMBODIMENTS OF THE INVENTION

Figure 1:
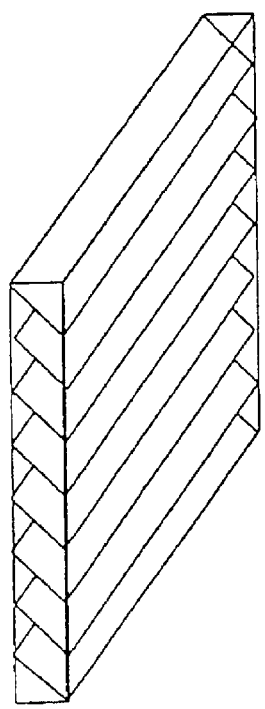
FIG. 1 illustrates the transparent slab comprising a series of glass strips angled to reflect vertically incident light through 90°.

The transparent slab 1 shown in FIG. 1 is made by cutting approximately 0.5 mm thick sheets of highly transparent float glass into rectangular strips, then laying them one on top of another and in parallel so that their long sides are all in the horizontal, but their short sides are all at 45° to the horizontal. The stack is suffused with glue of a refractive index chosen so that the dielectric interface between glue and glass is weakly reflecting, then the stack is polished into a cuboid slab with faces parallel to the edges of the glass strips.

Figure 2:
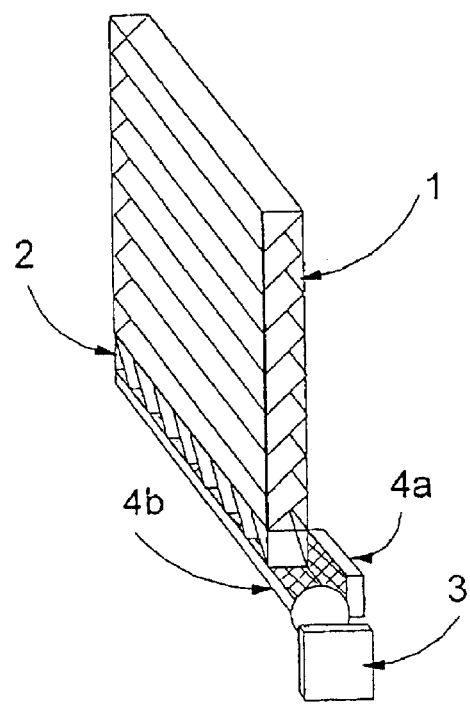
FIG. 2 illustrates a flat-panel projection display.

A transparent rod 2 is made in the same way as the transparent slab 1, except that the rod 2 has an approximately square cross-section corresponding to the thickness of the slab. FIG. 2 shows how the flat-panel projection display is assembled by focussing a video projector 3 into one end of the rod 2, then placing the rod 2 adjacent and parallel to the base of the transparent slab 1 with such an orientation that light from the video projector 3 is ejected perpendicularly from the rod 2 into the transparent slab 1.

The axis of the video projector 3 should be at an angle to both the horizontal and the vertical so that no ray from the video projector 3 travels parallel to the rod axis. Furthermore a pair of front-silvered mirrors 4a, 4b should be placed at the rod input, i.e. at the end near the projector, against either side opposite the video projector 3, and the video projector 3 should evenly illuminate both the rod input and the three images of the rod input presented to the video projector 3 through the front-silvered mirrors 4a, 4b. Injected light travels along the rod, being reflected from the sides, so that no light is lost, and being partly reflected at each mirror interface, where it leaves the rod and enters the slab; similarly within the slab itself.

Figure 3:
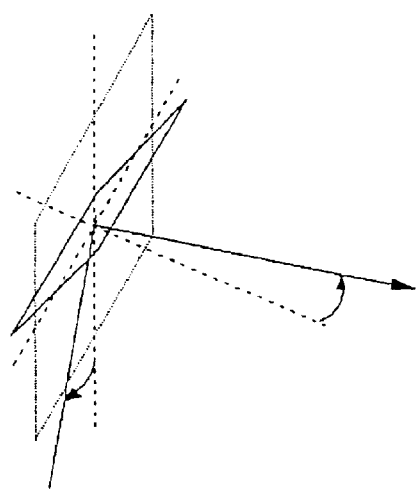
FIG. 3 illustrates a mirror angled to reflect vertically incident light through 90°, and shows how rotating the direction of incidence about the initial direction of reflection causes the reflected light to rotate in the horizontal plane.

It is a simple experiment to shine light vertically up at a mirror pivoted at 45° to the horizontal and FIG. 3 shows how the mirror reflects the light into the horizontal plane. If the direction of the incident light is rotated about the initial direction of the reflected light, then the direction of the reflected light is rotated in the horizontal plane. Alternatively if the direction of the incident light is rotated in the plane shared by the incident and reflected light, then the direction of the reflected light is rotated in the same vertical plane through an equal angle.

In a similar way, light shone vertically up the transparent slab 1 will be partially reflected at each glass/glue interface. Each of the glass/glue interfaces behaves in the same way as a single mirror in that if the direction of the incoming light is rotated about an axis normal to the slab 1, then the direction of the reflected light is rotated in the horizontal plane. The glass/glue interfaces are sufficiently closely spaced that the result is a flat-panel device from all parts of whose surface light can be made to travel in any single, selectable horizontal direction. The vertical direction in which light leaves the slab 1 may also be controlled, by rotating the direction of the incoming light about a horizontal axis in the plane of the slab 1.

A ray bouncing between the two walls of the transparent slab 1 will travel in either of two directions alternately, so the stack of mirrors will eject rays in either of two directions alternately. The result is that there is at least one unwanted ghost image, which is inconvenient. Furthermore, stacking sheets of glass is a laborious way of integrating a grating into a slab.

Figure 4:
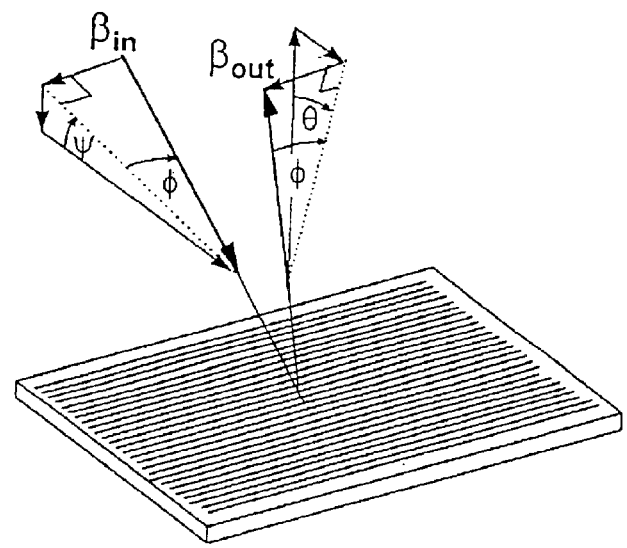
FIG. 4 illustrates how the direction of light coupled out of a transparent slab by a grating embossed on one side of the slab is determined by the direction of light injected into the slab and the periodicity of the grating.

FIG. 4 shows how a ray of light propagating in a transparent slab by total internal reflection can also be ejected normal to one surface of the slab if a grating 5 of appropriate spatial frequency is embossed on that surface. Just as with the mirrors of FIG. 1 and FIG. 3, rotating the direction of the guided ray about an axis normal to the surface of the slab will cause the direction of the ejected ray to rotate through the same angle in the plane shared by the normal and any line of the grating. But, as FIG. 4 shows, it is also possible to make the direction of the ejected ray alter in the orthogonal direction, i.e. away from the normal, by altering the angle of the propagating ray about an axis parallel to any line of the grating. The ray only interacts with the grating during reflection so, provided that the grating is blazed, rays will be ejected travelling in only one direction albeit either side of the plane of the grating.

This concept can be used in the invention as follows. Instead of being made out of strips of float glass, the gratings in either the slab 1 or the rod 2, or both, are created by configuring each as cuboids of pure glass, and embossing them with a diffraction grating, or mixing photosensitive particles into the glass and creating a volume hologram within the glass by illuminating it with a pair of laser beams.

In a preferred embodiment, the rod 2 is made of pure glass and embossed with a diffraction grating, and the slab 1 is made holographically. Light diffracted within the rod 2 away from the slab 1 is reflected by an extension of the mirror 4b along the whole length of the rod back towards the slab so that all diffracted light enters the slab.

The optical elements do not have to be made of glass, but this is a suitable material and easy to make free of defects. The components can be made on a scale of centimeters for, say, a head-up display or a wearable helmet-type display, but they could be larger. The video projector should have dimensions of the same order as the thickness of the rod and slab, though being perhaps five times as thick as them, and the parts can all be incorporated into a common housing to form a self-contained unit.

Figure 5:
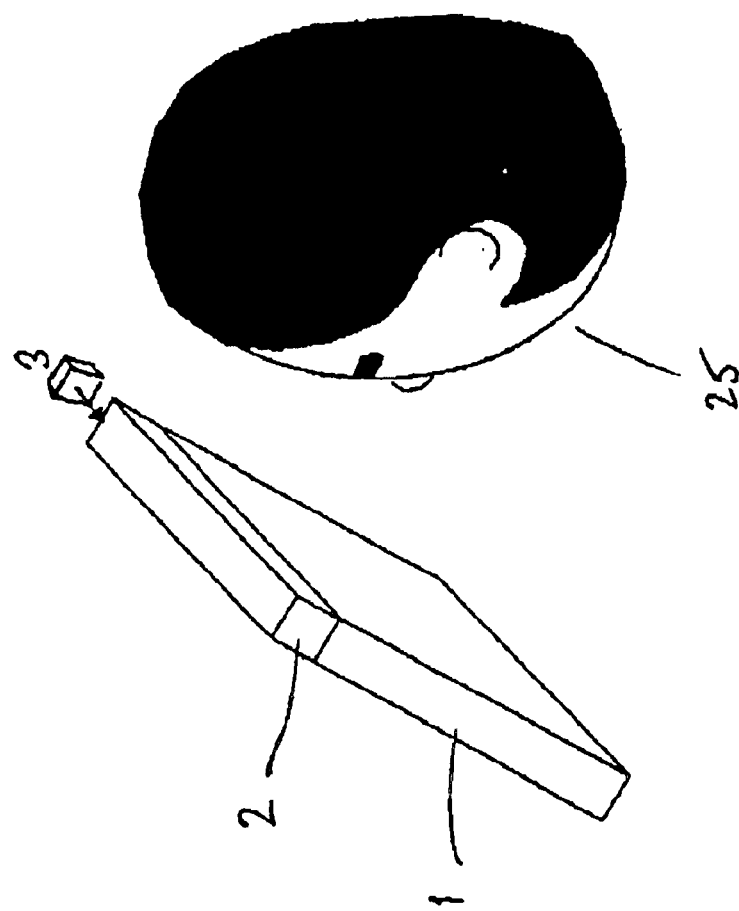
FIG. 5 shows a head-up display incorporating the invention.
Figure 5:
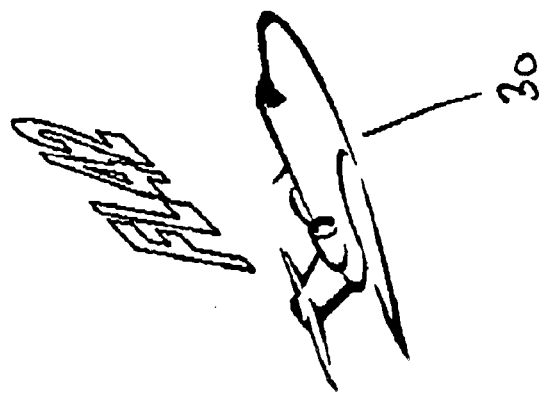

One application of the invention is to head-up displays to be retrofitted to civil aircraft in whose cockpits there is very little space. The system would be sloped flush with the sloped screen of the aircraft, so the ghost image produced by counter-propagating rays reflecting off the glass/glue mirrors will miss the pilot's eyes. Such a system is shown in FIG. 5. The viewer 25, in this case a pilot, observes a display comprising rod 2, slab 1 and projector 3, giving rise to a virtual image 30. It is possible that the edges of the glass/glue mirrors will form diffracted images of the sun and landing lights, but one would aim to eliminate this effect by grading the index of the edges.

Figure 6:
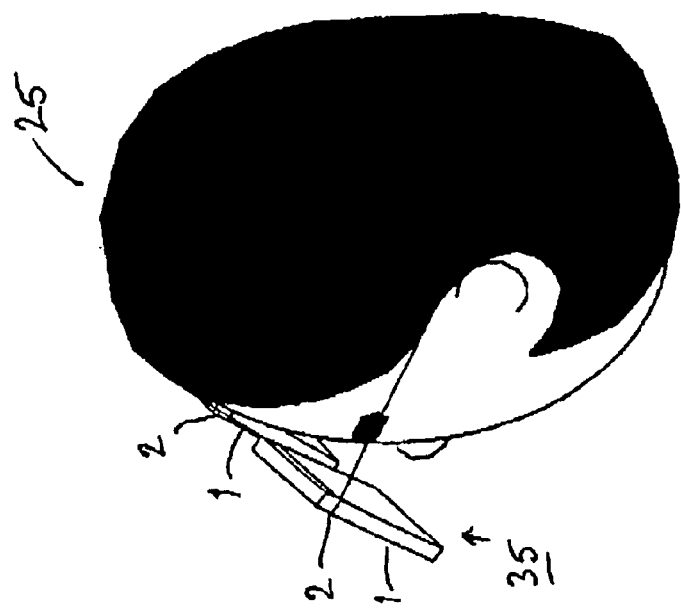
FIG. 6 shows a wearable display incorporating the invention.
Figure 6:
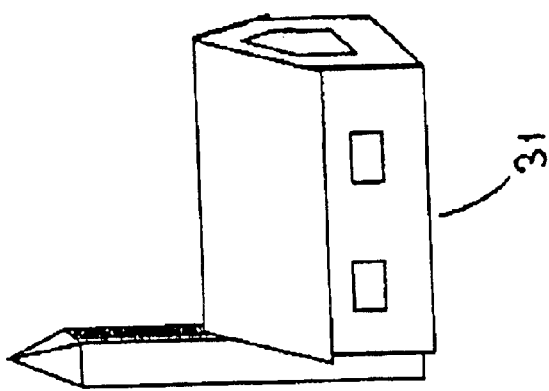

A wearable display is shown in FIG. 6. Here, two displays embodying the invention, each comprising a rod 2 and slab 1 and a projector, not explicitly shown, are used to form a pair of spectacles 35 worn by the user 25, who then sees a virtual image 31.

What is claimed is:

1. A flat-panel projection display comprising a transparent slab element and corresponding area grating, a transparent rod element with rectangular cross-section and corresponding linear grating, arranged along an edge of the slab element, and a small projector, in which the projector is arranged to direct an image into an input end of the rod element, the linear grating is adapted to divert the image into the plane of the slab element, and the area grating is adapted to project the image out of the slab element towards a viewer.

2. A flat-panel projection display according to claim 1, in which one of the gratings is a stack of transparent plates arranged at about 45° to the incoming and outgoing light.

3. A flat-panel projection display according to claim 1, in which at least one of the gratings is embossed on the surface of the rod element or the slab element.

4. A flat-panel projection display according to claim 1, in which at least one of the gratings, preferably that on the slab element, is holographic.

5. A flat-panel projection display according to claim 1, in which the rod and slab elements are made of glass.

6. A flat-panel projection display according to claim 1, further including mirrors arranged at the input end of the rod element and parallel to its axis, so as to direct substantially the entire output of the projector into the rod element.

7. A head-up display incorporating a flat-panel display as claimed in claim 1.

8. A wearable display including a flat-panel display as claimed in claim 1.

* * * * *